No. 775,083. PATENTED NOV. 15, 1904.
J. W. IVORY.
CLAMP FOR DENTAL DAMS.
APPLICATION FILED DEC. 5, 1903. RENEWED SEPT. 24, 1904.
NO MODEL.

Witnesses
Inventor
James W. Ivory.
By Diedersheim & Fairbanks
Attorneys

No. 775,083. Patented November 15, 1904.

UNITED STATES PATENT OFFICE.

JAMES W. IVORY, OF PHILADELPHIA, PENNSYLVANIA.

CLAMP FOR DENTAL DAMS.

SPECIFICATION forming part of Letters Patent No. 775,083, dated November 15, 1904.

Application filed December 5, 1903. Renewed September 24, 1904. Serial No. 225,756. (No model.)

*To all whom it may concern:*

Be it known that I, JAMES W. IVORY, a subject of the King of Great Britain, residing in the city and county of Philadelphia, State of Pennsylvania, have invented a new and useful Improvement in Clamps for Dental Dams, of which the following is a specification.

My invention relates to clamps for dental dams.

It consists of means for adjusting a rubber dam upon a tooth or adjacent teeth and for retaining such dam in position.

It further consists of novel features of construction, all as will be hereinafter fully set forth.

Figure 1:
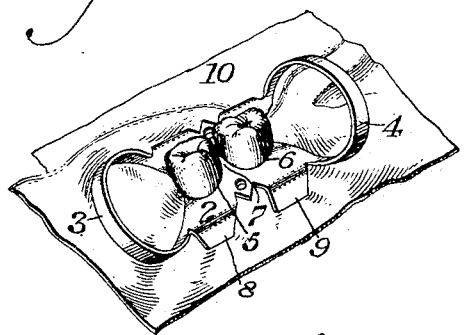
Figure 2:
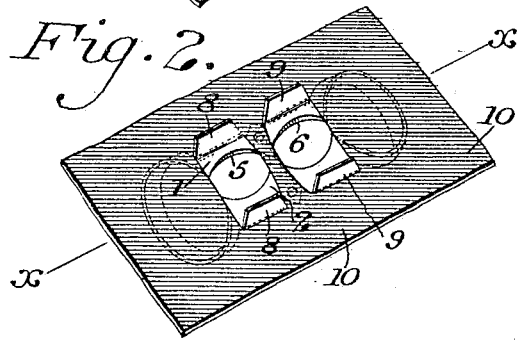
Figure 3:
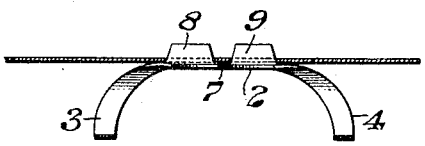
Figure 4:
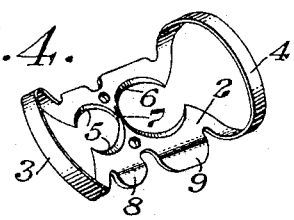

Figure 1 represents in perspective my adjusting-clamp in operation. Fig. 2 represents my device and a rubber sheet secured thereto, both being in an inverted position. Fig. 3 represents a section through the line $x\ x$, Fig. 2. Fig. 4 represents a perspective view of another form of the clamp.

Similar numerals of reference indicate corresponding parts in the figures.

Referring to the drawings, 1 and 2 designate the coacting jaws of my clamp, which jaws are connected at each end by bowed springs 3 and 4. The inner side of each jaw 2 is curved at 5 and 6 and has a pointed portion 7 between the reëntrant curved portions. The outer side of each jaw has downwardly-extending portions 8 and 9, corresponding in number and position to the curved portions 5 and 6.

The operation is as follows: Two small holes are pierced near each other in a rubber sheet 10. Both depending portions 8 are inserted in one of these apertures and both portions 9 in the other. The resilience of the springs 3 and 4 serves to stretch the sheet, as shown in Fig. 2. The sheet and clamp are then placed over two adjacent teeth, as shown in Fig. 1, the curved portions 5 and 6 fitting against the outer and inner faces of the teeth and the points 7 engaging therebetween. It will be noted from Figs. 1 and 4 of the drawings that the points 7 are of sufficient length to be overlapped or at least to meet between the teeth. This is of advantage in holding the clamp firmly and of particular advantage where it is desired to wedge the teeth apart to enable the operator to get at their adjacent surfaces. The sheet or dam is then slipped off the points 8 and 9 of the clamp and permitted to engage directly with the teeth, one of which will project through each aperture of the dam. The clamp acts to securely hold the sheet in position, while the portions 3 and 4 prevent it from rising to a position where it might either obstruct the light or interfere with the hand of the operator.

It will be seen that where one tooth only is to be operated upon my device by engaging with the next tooth is firmly held in position. It is, however, particularly advantageous where caries attacks, as frequently happens, the adjacent faces of two teeth.

It is evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. A dental sheet-adjusting clamp comprising coacting jaws, the inner sides of which are curved to embrace a plurality of teeth and provided with points adapted to enter between such teeth and to pass each other therebetween, and resilient means for forcing said jaws toward each other.

2. A dental sheet-adjusting clamp comprising coacting jaws having at their inner sides a plurality of reëntrant curved portions adapted to embrace a plurality of teeth and at their outer sides extending portions corresponding in number and position to said curved portions, each pair of said extending portions being adapted to detachable engagement in a separate aperture in the sheet.

JAMES W. IVORY.

Witnesses:
 JOHN A. WIEDERSHEIM,
 GEO. S. COOPER.